UNITED STATES PATENT OFFICE 2,662,049

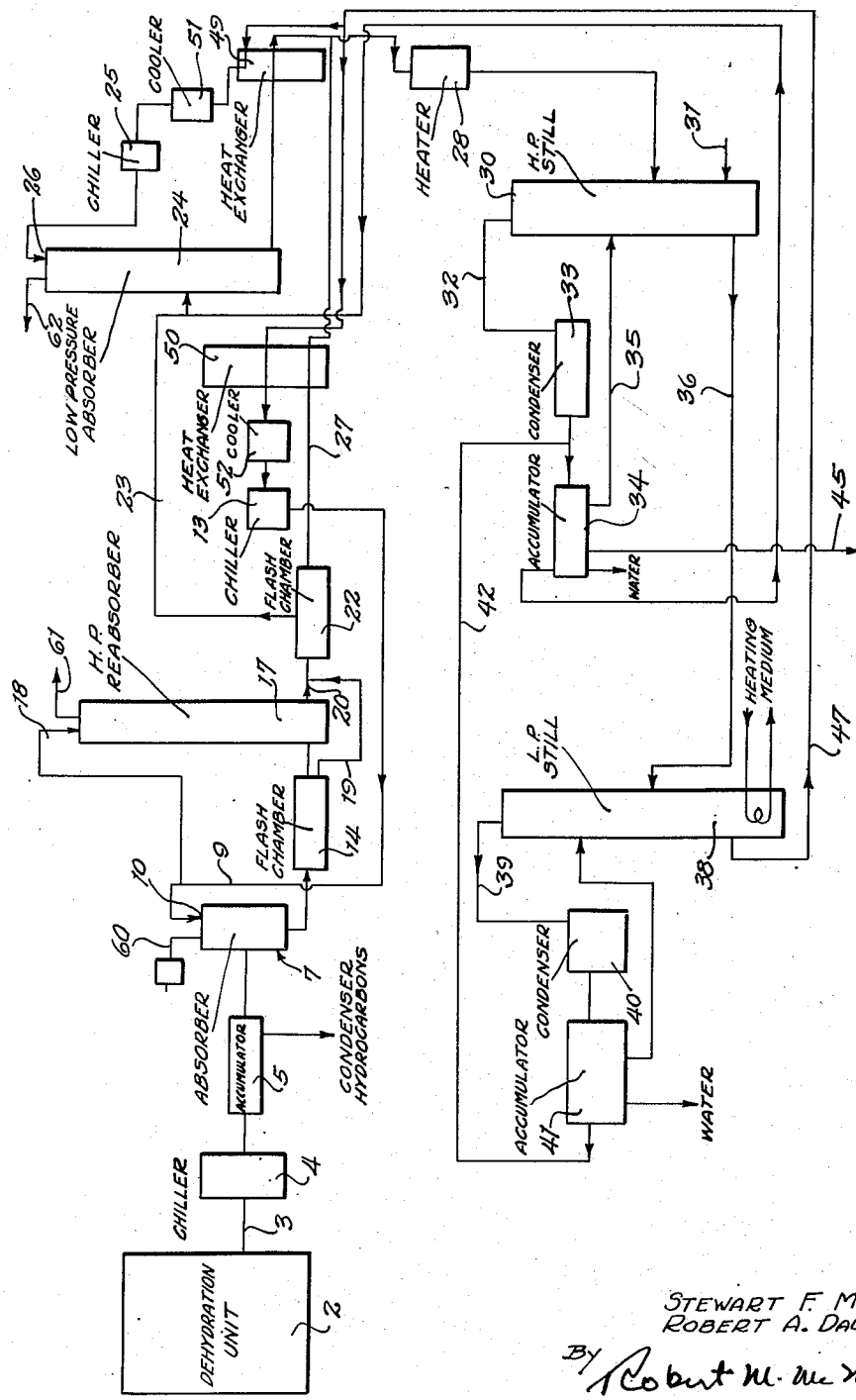

RECOVERY OF HYDROCARBONS

Stuart F. Magor and Robert A. Daugherty, Houston, Tex., assignors to The Superior Oil Company, Los Angeles, Calif., a corporation of California Continuation of application Serial No. 35,146, June 25, 1948. This application December 29, 1951, Serial No. 264,138

2 Claims. (Cl. 196—8)

The invention relates to a process and a plant for the recovery of hydrocarbons from high pressure well fluids and in particular to a process and an absorption plant wherein the absorbing oil used in the plant to recover hydrocarbons from the well fluid, and the well fluid are cooled prior to contact whereby a light absorbing oil may be used in such process.

This application is a continuation of my prior co-pending application filed on June 25, 1948, bearing Ser. No. 35,146, now abandoned, for an invention in Recovery of Hydrocarbons. The present application is entitled to the benefit of the filing date of said earlier filed application for all common subject matter.

Heretofore, in the recovery of hydrocarbons from well fluids it has been customary to subject the well fluid to a high pressure absorption in which a relatively heavy absorbing oil is used to denude the well fluid of the soluble hydrocarbons therein. Of course the type oil used in the absorption system depends upon the operating pressure of the absorption system, the temperature at which the absorption tower is operated and other such features.

For example, with pressures up to 300 lbs. per sq. inch gauge it is customary to use an oil of 40 degrees to 42 degrees API with minimum molecular weight of about 160. This oil has on an average about .0427 pound mol. per gallon and is considered in the art as being a "light" oil. With pressures up to 700 lbs. per square inch gauge it is common to use an absorbing oil of about 36 API with an average molecular weight of about 190. This oil will have an average of .0370 mol per gallon. At pressures from 1000 to 1500 lbs. per square inch gauge or higher, it is common to use an absorbing oil of about 32 degrees API with a molecular weight of approximately 230 to 260. The average number of mols per gallon of this oil will be about .0314; this oil is much heavier than the 40 degree oil and is considered a "heavy" oil in the art.

Since the absorption of the hydrocarbons from the well fluid is based upon the number of mols of absorbing oil circulated through the absorption system it seems obvious from the foregoing illustration that a light oil of about 40 to 42 degrees API is 1.36 times as effective as the heavy or 32 degree API oil when based on a gallonage basis.

It has heretofore been customary to operate such systems at approximately 90 degrees F. and at high pressures (for example from 700 pounds per square inch), to use a heavy absorbing oil having an average mol weight of about 230 to 260. It is necessary to use this type oil at the temperature aforementioned at pressures ranging from 700 lbs. per square inch on up, since the absorbing oil is subject to retrograde vaporization at the operating pressures and temperatures involved in present day processes. Therefore unless a heavy oil is used, large quantities thereof will be lost due to vaporization and they will pass out of the absorption system along with the denuded well fluid.

It seems obvious from the foregoing that if a lighter oil could be substituted for the heavier oil in the absorption system without suffering any greater loss thereof by retrograde vaporization a great number of benefits would be derived. For example, a smaller amount of absorbing oil could be circulated through the system, while still obtaining a highly efficient denuding of the well fluid and since the oil would be lighter the pumping costs would be reduced accordingly as compared to when heavy oil is used in the absorption system. Furthermore, it would be more economical to separate a light absorbing oil from the absorbed constituents.

It is an object therefore of the present invention to provide a method of treating well fluid to recover hydrocarbons therefrom by the use of a light absorbing oil or menstruum.

Another object of the invention is to enable adjustment of temperature of incoming well fluid which is to be subjected to an absorption process and the absorbing oil used in such process in a manner that a lighter oil may be used as the absorbing oil.

It is still another object of the invention to dehydrate the well fluid prior to subjecting it to an absorption system whereby formation of hydrocarbon hydrates is eliminated and corrosion of the absorption system is minimized.

Yet another object of the invention is to provide a process for stripping selected hydrocarbons from a well fluid in an absorption system, the absorbing oil in such system being a light oil but the temperature of such system being maintained at a point to inhibit loss of such absorbing oil by retrograde vaporization.

Another object of the invention is to use a light oil in an absorption system to recover desired hydrocarbons from a high pressure well fluid and to thereafter selectively remove such hydrocarbons from the absorbing oil.

Another object of the invention is to use a light oil in an absorption system to recover desired hydrocarbons from a high pressure well fluid and to thereafter selectively remove such hydrocarbons from the absorbing oil by subjecting the mixture of dissolved hydrocarbons and absorbing oil to a multistage stripping process, e. g. in a two stage stripping process, utilizing the invention, the first still may be operated at a pressure of approximately 150 lbs. and, with inert gas stripping, take overhead, a product having an end point of approximately 225° F. and then subjecting the bottom product comprising the remaining absorbed hydrocarbons and absorbing oil to dry distillation in a low pressure still, resulting in a completely dehydrated absorbing oil.

A still further object is to provide a method and apparatus for recovery of hydrocarbons by absorption and in a manner that upon completion of the recovery operation the absorbing oil reclaimed for reuse is substantially denuded of water.

Other and further objects and advantages of the invention will become more readily apparent from a consideration of the accompanying drawing which is a schematic diagram of a flow sheet illustrating the preferred embodiment of the invention.

In the method of operation of the plant in accordance with the invention, high pressure well fluid from an outlet well of a subterranean formation is passed into the dehydration unit 2. The pressure of the well fluid obtained from the formation may vary from a few hundred pounds per sq. in. up to four or five thousand pounds. It is therefore desirable to reduce and regulate the pressure of the well fluid before treating it in accordance with the present invention.

As a practical matter the well fluid will probably have an initial pressure of at least 700 pounds when injected into the system, with the maximum operating pressures ranging up to around 2000 pounds per sq. in. The temperature of the well fluid is regulated by any suitable heat exchanger apparatus so that it approximates 80 degrees F. when injected into the dehydration unit. The dehydration unit 2 is of a conventional type in which a suitable dehydrating agent is used to remove water vapor from the well fluid.

The dehydrated well fluid is then passed through the line 3 to the well fluid chiller 4 in which the temperature thereof is reduced to approximately 60 degrees F. This refrigeration system may be of any conventional type and any conventional refrigerating medium may be used. It is assumed of course that any distillate in the well fluid as it comes from the formation will be subjected to a dehydration process as is the gas or well fluid and is then chilled along with the gas or well fluid in the chiller 4. An accumulator 5 receives the gas distillate mixture from the chiller 4 and the gaseous portion, or well fluid, is separated from the liquid or distillate. The gaseous portion of the well fluid, denoted herein as well fluid, passes to the high pressure absorption system denoted generally by the numeral 7. One or more absorption towers may be used which are of suitable sizes so as to accommodate the throughput of the well fluid. In order to remove the hydrocarbons which are soluble in an absorbing oil such oil is injected into the absorption system so that it preferably passes countercurrent to the flow of well fluid whereby intimate contact of the two is assured. As shown in the drawings the absorbing oil is injected through the line 9 and into the top of the tower at 10.

Before passing the oil into the absorption system it is passed through the chiller 13 which reduces the temperatures thereof to a suitable point so that little or no retrograde vaporization will occur at the operating pressure of the absorption system. As a practical matter the pressure in the high pressure absorption system as previously stated will range from about 700 to 2000 p. s. i. It has been determined that at about 1500 p. s. i. it is desirable to cool the absorbing oil to a temperature approximating 60 degrees F. Due to the temperature of the absorbing oil and the well fluid prior to contact in the high pressure absorption system the retrograde vaporization of the oil is limited to that which would be suffered by a heavy oil at normally used temperature. Furthermore, it is possible to use a lighter oil such as one having an average molecular weight of about 155 and a gravity of about 49 degrees API. A further advantage resides in the fact that the cost of separation of a light oil from the absorbed hydrocarbons is far less than with a heavy oil.

The oil from the base of the absorption system 7 is passed into the flash chamber 14 which operates at approximately 425 p. s. i. g. The flash vapors from the flash chamber 14 are introduced into the high pressure reabsorber 17 into which the chilled absorbing oil is injected at 18. The medium which does not vaporize in the flash chamber 14 is an oil which is rich in the hydrocarbons absorbed from the well fluid. This rich oil is passed through the line 19 and is co-mingled with the oil passing through the line 20 out of the high pressure reabsorber and is then injected into the flash chamber 22 which operates at a pressure approximating 200 p. s. i. g. Any vapors from this flash chamber are passed through the line 23 and are treated in the low pressure absorber 24 which operates at a pressure approximating 500 p. s. i. g. Absorbing oil from the system is passed through the chiller 25 and into the low pressure reabsorber as at 26. That portion of the mixture of absorbing oil and dissolved hydrocarbons which did not vaporize in the chamber 22 is passed through the line 27 and into a heater 28 to elevate the temperature thereof to approximately 390° F. The rich oil from the base of the low pressure reabsorber is also passed to the heater or preheater 28 through the line 29. The still 30 may be operated at any suitable pressure and temperature depending upon what range of components are to be extracted from the mixture of absorbing oil and hydrocarbons at this particular point. For example, it will be assumed that the pressure of the still 30 will be approximately 150 p. s. i. g. Any suitable inert gas may be injected into the still 30 and it will be assumed that steam is injected through the line 31 so as to remove hydrocarbons dissolved in the absorbing oil which vaporize up to 225 degrees F. The inert gas injected in the line 31 and the absorbed hydrocarbons pass from the top of the still 30 through the line 32 and into the condenser 33, the components pass to the accumulator 34. A line 35 from the accumulator 34 may be used to reinject a portion of the constituent back into the still 30 if it is desired to maintain a reflux. The residual mixture of absorbing oil and dissolved hydrocarbons therein which were not stripped by the inert gas stream pass from the base of the tower through the line 36 and into the low pressure still 38.

While the invention, as disclosed herein, proposes the use of dry distillation to dehydrate and denude the absorbing oil, if any, residual absorbed components, any method well known in the art could be used to dehydrate and denude the oil.

Heat may be applied to the still to vaporize the hydrocarbon constituents while leaving the absorbing oil in liquid bottoms. Of course the temperature in the still 38 will depend somewhat upon the type absorbing oil used and it has been found that operating a plant at the foregoing pressures and with an absorbing oil having the characteristics of that disclosed herein a temperature approximating 400 degrees is necessary in the low pressure still to effect separation of the residual hydrocarbons dissolved in the absorbing oil. At any event, a temperature is used in the dry still which will not "crack" the oil. Heretofore, it has been impracticable to finally separate the dissolved hydrocarbons from the absorbing oil by a dry distillation process. However, in the present invention due to the type absorbing oil which may be used when it and the well fluid are at a suitable temperature prior to contact with each other a dry distillation can be used to effect separation.

The hydrocarbon components are passed out of the top of the tower 38 through the line 39 and into the condenser 40. From the accumulator 41 the hydrocarbon components are passed through the line 42 and into the accumulator 34. From here the hydrocarbon components are passed through the line 45 to suitable fractionating means whereby they may be separated.

The absorbing oil from the still 38 is passed through the line 47 and divided into two parts which are passed through each of the exchangers 49 and 50 and into coolers 51 and 52, then to the chillers 25 and 13 respectively. It is to be noted that the mixture of absorbing oil and hydrocarbons which is relatively cool as it leaves the absorption system is passed through the heat exchangers 49 and 50 whereby the mixture of oil and hydrocarbons obtains heat from the absorbing oil ejected from the still 38. Similarly the absorbing oil is cooled by the cool mixture of absorbing oil and hydrocarbons prior to passing such oil to the oil cooler and chiller.

While specific temperatures and pressures have been given in the present application it is to be understood that such temperatures and pressures are merely exemplary and not to serve as a limitation upon the scope of the invention.

The absorption system may be operated at any desired pressure and the well fluid and absorbing oil may be cooled to any desired temperature; however, it is to be noted that the desired temperature of the oil and well fluid should be one which is economically easy to obtain on the one hand, while on the other hand the temperatures should be such so that a light oil may be used in the absorption system without suffering substantial loss thereof by retrograde vaporization.

The invention is particularly adapted to high pressure absorption systems. The gases or well fluids from which the hydrocarbon components are removed are ejected out of each of the absorbers 7, 17, and 24 through the lines 60, 61, and 62 respectively. Such gas may be reinjected in an inlet well leading to the formation from which the gas was taken or it may be directed to commerce. It is to be further noted that by using a light absorbing oil and by dehydrating the gas prior to absorption thereof by the absorbing oil corrosion of the equipment is lessened and the ease of separation of the absorbing oil from the dissolved hydrocarbons is increased.

While the invention has been disclosed as pertaining to an absorbing oil, it is to be noted that the use of this term serves only as an example and that any other menstruum may be used in practicing the invention.

Broadly, the invention contemplates an absorption recovery system wherein the fluid from which components are to be recovered and the absorbing oil used to recover such components are regulated to a predetermined temperature prior to contact in the absorption system whereby a lighter oil may be used in such system.

What is claimed is:

1. A process for absorption-recovery of desired hydrocarbon fractions from gases, which comprises substantially completely dehydrating the gas, refrigerating the dehydrated gas to a temperature not above about 60° F., separately refrigerating a substantially completely dehydrated absorption oil to a temperature not above about 60° F., absorbing said desired fractions from the refrigerated gas in said dehydrated, refrigerated absorption oil, subjecting the resultant enriched oil to a relatively high pressure distillation step in the presence of an inert gaseous stripping medium to separate the undesired hydrocarbons therefrom, subjecting the resultant partially stripped oil to a low pressure dry distillation step to substantially completely remove therefrom the remaining absorbed hydrocarbons and water, at a temperature below the cracking temperature of the absorption oil, and returning the dehydrated oil to the second-mentioned refrigeration step, said absorption oil having an A. P. I. gravity above 42° and an average molecular weight below about 155.

2. A process for absorption-recovery of desired hydrocarbon fractions from gases, which comprises substantially completely dehydrating the gas, refrigerating the dehydrated gas to a temperature not above about 60° F., separately refrigerating a substantially completely dehydrated absorption oil to a temperature not above about 60° F., absorbing said desired fractions from the refrigerated gas in said dehydrated, refrigerated absorption oil, subjecting the resultant enriched oil to a relatively high pressure distillation step in the presence of an inert gaseous stripping medium to separate the undesired hydrocarbons therefrom, subjecting the resultant partially stripped oil to a low pressure dry distillation step to substantially completely remove therefrom the remaining absorbed hydrocarbons and water, at a temperature not above about 400° F., and returning the dehydrated oil to the second-mentioned refrigeration step, said absorption oil having an A. P. I. gravity above 42° and an average molecular weight below about 155.

STUART F. MAGOR.
ROBERT A. DAUGHERTY.

References Cited in the file of this patent
UNITED STATES PATENTS

| Number | Name | Date |
|---|---|---|
| 2,297,675 | Dayhuff et al. | Oct. 6, 1942 |
| 2,386,057 | Noble | Oct. 2, 1945 |

OTHER REFERENCES

Wilson, "Refiner and Natural Gasoline Manufacture," vol. 21, No. 6, pages 176–181, (1942).